(12) United States Patent
Khoury

(10) Patent No.: US 7,074,062 B2
(45) Date of Patent: Jul. 11, 2006

(54) CORDLESS BASE

(76) Inventor: Edward Khoury, 19 Scouler Way, Bateman, Perth, Western Australia 6150 (AU)

(*) Notice: Subject to any disclaimer, the term of this patent is extended or adjusted under 35 U.S.C. 154(b) by 0 days.

(21) Appl. No.: 10/982,474

(22) Filed: Nov. 5, 2004

(65) Prior Publication Data

US 2005/0142911 A1  Jun. 30, 2005

Related U.S. Application Data

(63) Continuation of application No. 10/479,261, filed as application No. PCT/AU01/00827 on Jul. 10, 2001, now Pat. No. 6,843,667.

(30) Foreign Application Priority Data

Jun. 1, 2001 (AU) .................................. PR5384

(51) Int. Cl.
H01R 13/44 (2006.01)

(52) U.S. Cl. .................. 439/131; 439/640; 439/929; 439/534; 439/568

(58) Field of Classification Search ............... 439/131, 439/535, 533, 640, 929, 950, 650, 568, 534; 219/432, 435

See application file for complete search history.

(56) References Cited

U.S. PATENT DOCUMENTS

| | | | |
|---|---|---|---|
| 2,722,777 A | 11/1955 | Simpson |
| 2,798,930 A | 7/1957 | Frost |
| 2,863,037 A | 12/1958 | Johnstone |
| 3,056,013 A | 9/1962 | Charles |
| 3,608,988 A | 9/1971 | Amberg |
| 3,715,627 A | 2/1973 | D'Ausilio |
| 3,735,329 A | 5/1973 | Funabashi et al. |
| 3,794,952 A | 2/1974 | Dowis |
| 3,915,079 A | 10/1975 | Balderson |
| 4,148,544 A * | 4/1979 | Markowitz .................. 439/640 |
| 4,500,150 A | 2/1985 | Leibensperger et al. |
| 4,577,187 A | 3/1986 | Barr et al. |
| 4,588,938 A | 5/1986 | Liataud et al. |
| 4,619,489 A | 10/1986 | Hinkens |
| 4,647,831 A | 3/1987 | O'Malley et al. |
| 4,672,292 A | 6/1987 | Hernandez |
| 4,681,385 A | 7/1987 | Kruger et al. |
| 4,739,242 A | 4/1988 | McCarty et al. |
| 4,784,616 A | 11/1988 | Zimmermann |
| 4,985,845 A | 1/1991 | Gotz et al. |
| 4,996,628 A | 2/1991 | Harvey et al. |
| 5,057,381 A | 10/1991 | Persen |
| 5,124,532 A | 6/1992 | Hafey et al. |
| 5,187,422 A | 2/1993 | Izenbaard et al. |
| 5,283,420 A | 2/1994 | Montalto |

(Continued)

FOREIGN PATENT DOCUMENTS

DE     29702211     5/1997

(Continued)

*Primary Examiner*—Ross Gushi
(74) *Attorney, Agent, or Firm*—D. Peter Hochberg; Sean Mellino; Katherine R. Vieyra

(57) ABSTRACT

A modular appliance system comprising a plurality of modular appliances, a base unit for supporting at least two of the modular appliances simultaneously or a free standing unit for supporting one or more modular appliances simultaneously or a free standing appliance for supporting one or more modular appliances simultaneously. Hingedly attached extensions are movable between points under and around the base, free standing unit and free standing appliance. The extensions provide electric power through cordless connectors and may be pivoted, hingedly attached or on slides.

20 Claims, 4 Drawing Sheets

U.S. PATENT DOCUMENTS

| | | |
|---|---|---|
| 5,334,033 A | 8/1994 | Milan |
| 5,415,572 A | 5/1995 | Shepherd |
| 5,685,744 A | 11/1997 | Blanchot et al. |
| 5,954,525 A | 9/1999 | Siegal et al. |
| 5,966,821 A | 10/1999 | Armbruster et al. |
| 5,971,810 A * | 10/1999 | Taylor ............... 439/675 |
| 5,989,070 A | 11/1999 | Al-Turki |
| 6,049,192 A | 4/2000 | Kfoury et al. |
| 6,127,802 A | 10/2000 | Lloyd et al. |
| 6,178,290 B1 | 1/2001 | Weyrauch et al. |
| 6,192,787 B1 | 2/2001 | Montalto |
| 6,340,807 B1 | 1/2002 | Wang |
| 6,349,036 B1 | 2/2002 | Chang et al. |
| 6,568,946 B1 | 5/2003 | Chou |
| 6,634,910 B1 | 10/2003 | Lieb et al. |
| 6,642,450 B1 | 11/2003 | Hsiao |
| 6,748,707 B1 | 6/2004 | Buchalter et al. |
| 6,761,578 B1 | 7/2004 | Stavely et al. |
| 2002/0182942 A1 | 12/2002 | Lieb et al. |

FOREIGN PATENT DOCUMENTS

| | | |
|---|---|---|
| FR | 2 776 134 | 9/1999 |
| GB | 2186184 | 8/1987 |
| GB | 2189354 | 10/1987 |
| GB | 2318926 | 5/1998 |
| GB | 2 324 015 | 7/1998 |
| GB | 2 231 208 | 11/1999 |
| WO | WO96/22718 | 8/1996 |
| WO | WO01/52704 | 1/2000 |

* cited by examiner

CORDLESS BASE

CROSS REFERENCE TO RELATED APPLICATIONS

This application is a continuation of prior U.S. application Ser. No. 10/479,261, filed on Apr. 30, 2004, now U.S. Pat. No. 6,843,667, which is a U.S. national phase application of International Application No. PCT/AU01/00827, filed on Jul. 10, 2001, and which claims the priority of Australian application number PR5384, filed on Jun. 1, 2001.

BACKGROUND OF THE INVENTION

1. Field of the Invention

This invention relates to power supply apparatus for domestic appliances.

2. Description of the Prior Art

The invention is concerned with such apparatus of the kind including a cordless connector for connection to a female connector in an appliance. Known power supply apparatus of this kind comprise a base unit which rests on a working surface and on which the appliance stands when engaging the connector. The base unit is bigger than the appliance and very much larger than the connector. Typical arrangements of this kind are disclosed in GB 2,318,926, U.S. Pat. No. 6,340,807 and WO 01/52704. Such arrangements work satisfactorily. However they are perforce of substantial size and take up a considerable portion of the area of any working surface on which they stand. They continue to take up such area when the appliance is not in use and even if the appliance is stored away. This is a disadvantage in modern kitchens which often have restricted work surfaces.

SUMMARY OF THE INVENTION

According to one aspect of the invention there is provided a power supply device comprising a, preferably cylindrical, cordless connector and a connector support, which in use rests on a working surface, which is preferably circular in plan, on which is mounted the connector, preferably coaxially therewith, and which is connectable to a source of power, wherein the connector support is of the same order of size as the connector.

The device may conveniently comprise an elongated member which extends transversely to and the end of which is constituted by the connector support, the connector support being connectable to the source of power through the elongated member.

According to another aspect of the invention there is provided a power supply apparatus comprising a distribution member to which the elongated member is connected and through which it is connectable to a source of power.

The distribution member is preferably a housing member including a cavity for the device wherein the device member is movable relative to the base from a retracted or housed position in the cavity and an outer position in which the connector is accessible to an appliance. Where the device is the elongated member, it is preferably pivotally connected to the housing member to pivot about a pivot axis, which may be horizontal or vertical, between the said retracted and outer positions. Alternatively the elongated member may be slidable into and out of the housing member.

According to a third aspect of the invention the distribution member is embodied in an appliance.

Embodiments of the invention will now be described by way of example with reference to the accompanying drawings.

DETAILED DESCRIPTION OF THE INVENTION

Figure 1:
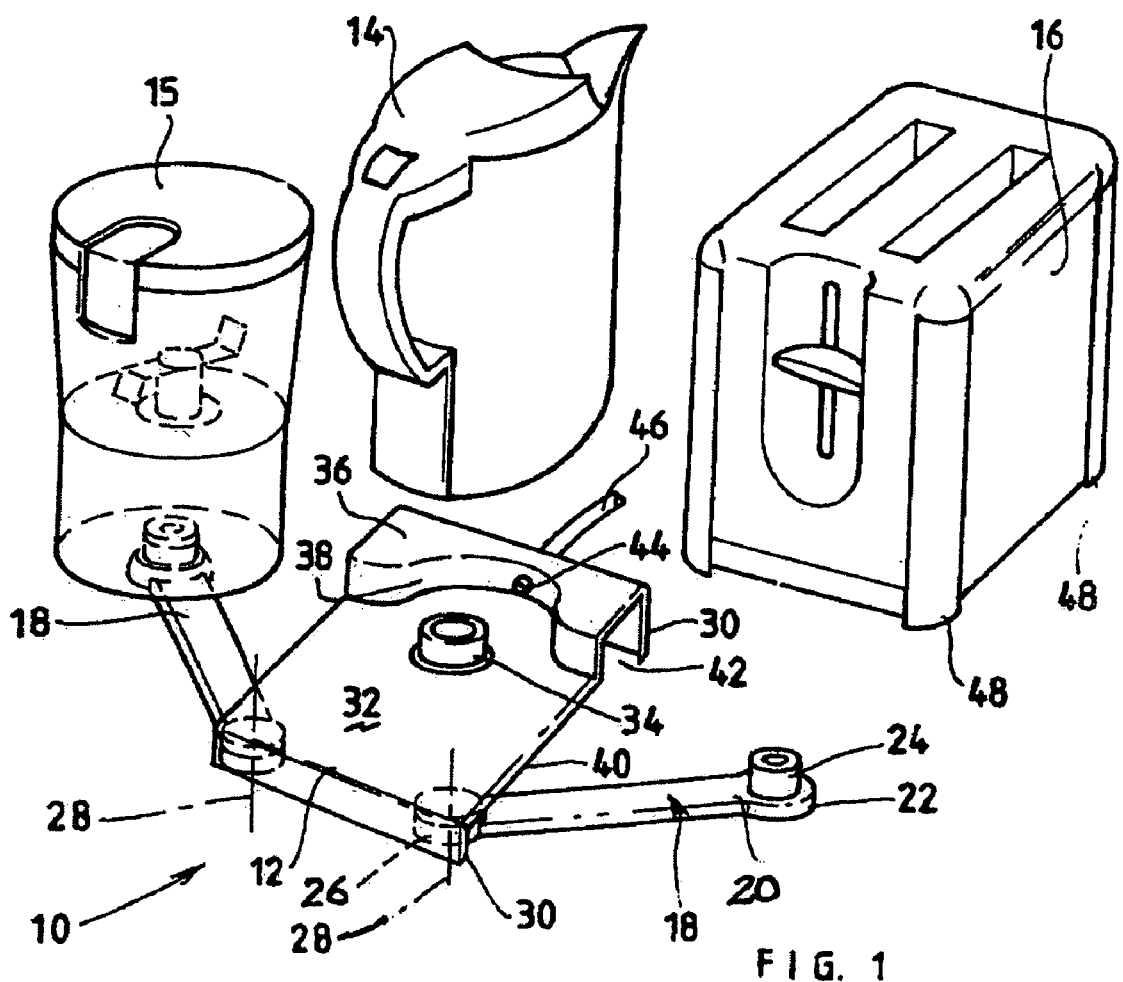
FIG. 1 is a perspective view of a modular appliance system utilizing a power reference apparatus of the invention.
Figure 2:
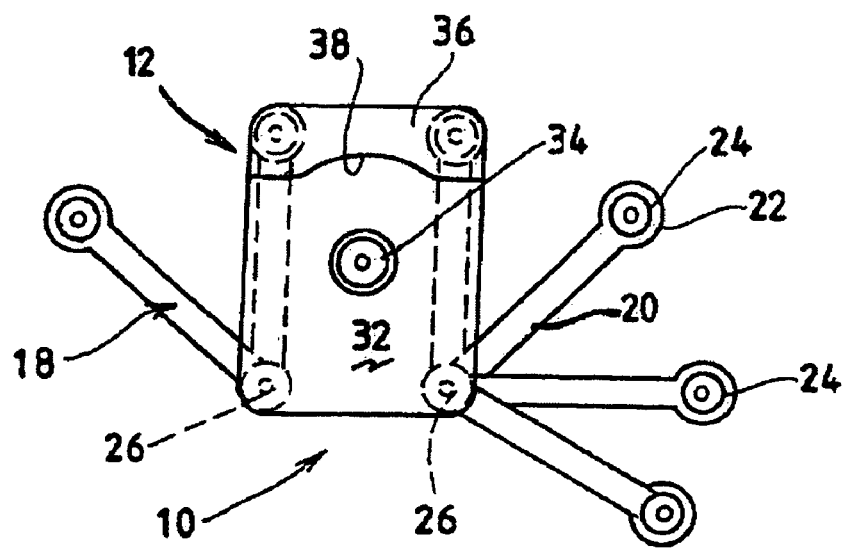
FIG. 2 is a top view of the power supply apparatus of FIG. 1.

Referring now to FIGS. 1 and 2 there is shown a modular appliance system comprising a power supply apparatus 10, incorporating a distribution member 12, and a set of modular appliances 14, 15 and 16. The distribution member 12 is normally carried on a working surface. It is moulded from a suitably tough and heat resisting plastics material such as polypropylene. The distribution member 12 can be formed from other suitable plastics or other materials including metals such as stainless steel or natural materials such as marble or wood.

The distribution member 12 has a pair of power supply devices 18 which are attached to it as will be described. Each power supply device 18 comprises an elongated extension arm 20 that is a low flat elongated member of substantially rectangular cross-section. The free end of each arm 20 has a circular end piece 22 to which the arm extends transversely. This end piece 22 has coaxially mounted thereon a vertical cylindrical cordless connector 24 which is known to those skilled in the art. The width of the arm 20 is slightly less than the diameter of the connector 24. The end piece 22, which in use rests on the working surface, serves as a support for the connector 24 and is of slightly greater diameter than the connector 24 (or in other words, it is larger but is of the same order of size). The inner end of each arm 20 is connected to a pivot member 26 to swing about a vertical axis 28 relative to the distribution member 12 from extended operative position and a retracted housed position as will be described more fully below.

The distribution member 12 is generally rectangular in plan. It has end feet 30 carrying a top support surface 32. In the center of the top support surface 32 is a vertical cylindrical cordless connector 34 which is substantially identical to the connectors 24. At one end, the distribution member 12 has a locating formation 36 with an inner concave arcuate surface 38 to assist in locating an appliance thereon. Below the support surface 32 is a cavity 40 in which the arms 20, when in their retracted housed positions, may be received.

Underneath the ends of the locating formation 36 are enlarged cavities 42 in which connectors 24 may be respectively received.

On the center of the locating formation 36 there is a safety cut out 44. An electrical cable 46 leading to a source of electrical power is also connected to the distribution member 12. The items 44 and 46 are not shown in FIG. 2. Suitable electric wires (not shown) are provided to connect the distribution member 12 to the pivot members 26 and via the arms 20 and the connector support 22 to the connectors 24. There are also internal wires (not shown) leading to the connector 34.

As can be seen from FIG. 2 and as mentioned above, the arms 20 can swing about the pivot members 26 between (i) closed positions indicated in broken lines in which the arms 20 are below the support surface 32 and the connectors 24 are received in the cavities 42 and (ii) any one of a number of extended operative positions (some of which are shown in full lines) in which the connectors 24 are accessible to the appliances. It will be seen too that when the arms 20 are in their retracted positions the power supply apparatus is very compact.

The modular appliances shown are a kettle 14, a chopper 15 and a toaster 16. All these appliances are free standing. The kettle 14 and chopper 15 have circular bases. The toaster 16 has legs 48 which support the toaster on a work surface, lifting the body off the working surface. On their undersurfaces, the appliances 14, 15 and 16 are each provided with a complementary female connector or receptor unit which cooperates with one of the cordless connectors 24 or 34. The size of the bases of the appliances are considerably larger than the connectors 24 as is apparent from the drawings and in particular the drawing of the chopper 15.

As shown, the distribution member 12 also serves as a base unit for the kettle 14 to rest on the top support surface 32. As can be seen the top surface 32 is slightly larger in plan than the underside of the kettle 14. The other two appliances 15 and 16 have undersides which are significantly greater than the connectors 24 and connector supports 22 and sit on the working surface above the arms 20 with the receptor units receiving the connectors 24. It will be seen that the distribution member 12 and the power supply devices 18 form a power supply unit for providing power to the appliances.

Figure 3:
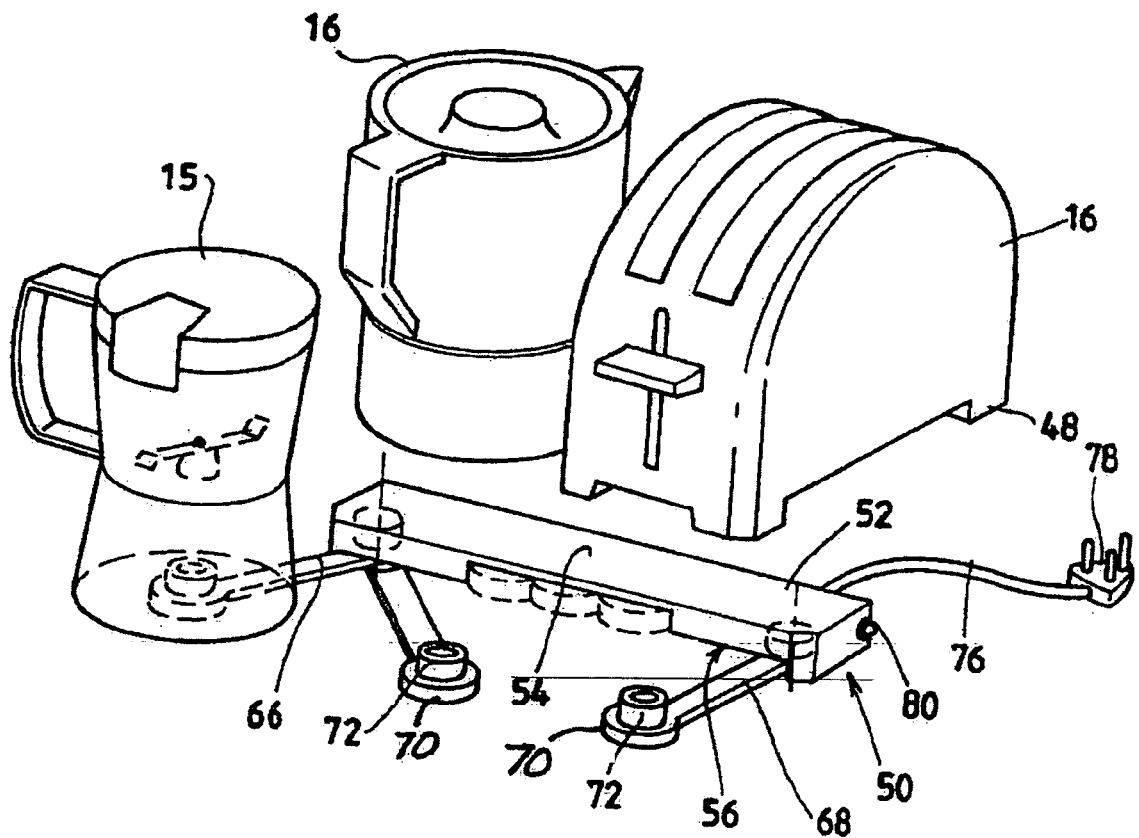
FIG. 3 is a view similar to FIG. 1 of another modular appliance system utilising a different power supply apparatus of the invention.
Figure 4:
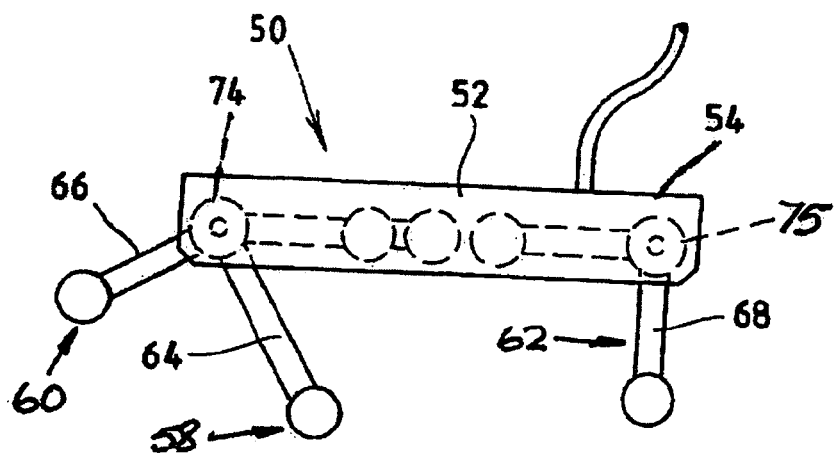
FIG. 4 is a top view of the power supply apparatus of FIG. 3.

Referring now to FIGS. 3 and 4, there is shown a modular appliance system with substantially the same appliances 14, 15 and 16 together with a power supply apparatus 50. The apparatus 50 includes a rectangular distribution member 52 with a flat upper surface 54 without any item thereon. The distribution member 52 has a large cavity 56 on its underside to serve as a housing member. There is an opening leading thereto. Three power supply devices 58, 60, 62 are provided. They are substantially identical to the devices 18 described with reference to FIGS. 1 and 2 comprising extension arms 64, 66 and 68 each having a connector support 70 at one end coaxially carrying a vertical cylindrical cordless connector 72.

The arms 64, 66 and 68 are connected to the distribution member 50 via two pivot hinges 74 and 75 whereby the extension arms 64, 66 and 68 may each be pivoted from a retracted housed position (shown in broken lines in FIG. 4) within the cavity 54 and extended positions outside the distribution member 60 (as shown in full lines in FIG. 4) in which the connectors 72 on the arms are accessible to the appliances.

The length of the arms 66 and 68 are the same. The extension arm 64, which is connected to the same pivot hinge 74 as extension arm 66 is somewhat longer than arm 66 so that in the retracted position it can be below the arm 66 with its connector 72 more remote from its hinge 74.

The distribution member 52 is connected to a source of power supply (not shown) through a cable 76 having a plug 78 at its end. A safety cut out 80 is provided on the distribution member 52. Power from the cable 76 is provided via the distribution member 52, the hinges 74 and 76 and extension arms to the cordless connectors 72 thereon. The housing member 60 is used with various appliances 14, 15 and 16 which are substantially identical to the appliances described in the first embodiment with the toaster 16 having similar legs 48. The appliances 14, 15 and 16 are connected to the connectors 72 in a manner similar to that described above.

Again it will be seen that when the power supply devices are in their retracted positions, the power supply apparatus is very compact. It will also be seen that the distribution member does not act as base unit in this embodiment.

Figure 5:
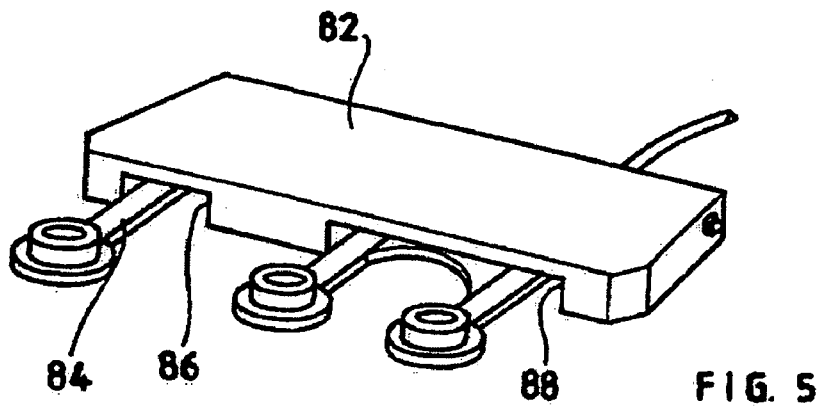
FIG. 5 is a perspective view of a further power supply apparatus of the invention.

Reference is now made to FIG. 5. A power supply apparatus comprises a distribution member 82 with three power supply devices 84 and a pair of cavities 86 and 88 therebelow. These devices 84 are substantially identical to the devices 18 save that there they are connected to the distribution member 82 to be slidable relative thereto. The devices are movable from retracted positions within the cavity 86 and 88 in the member 82 and operative positions outside the member 82 (as shown) to make the connectors 22 accessible to the appliances.

Figure 6:
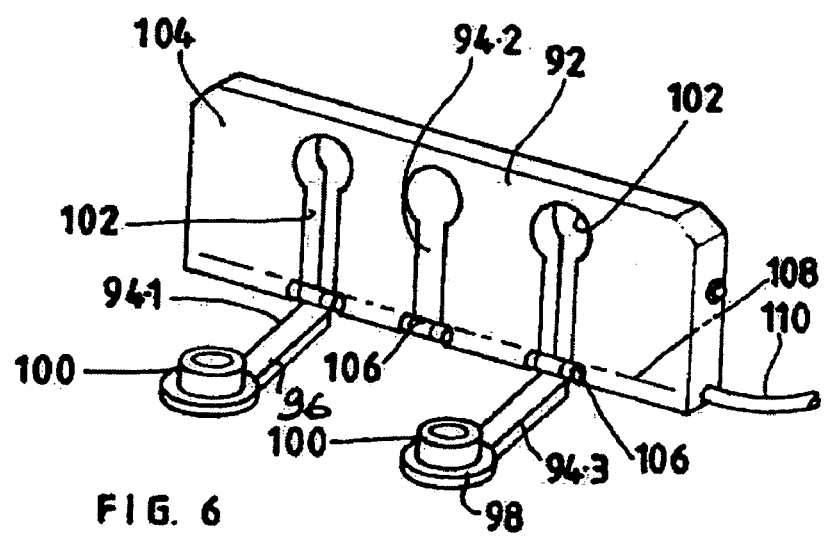
FIG. 6 is a perspective view of yet another power supply apparatus of the invention.

In the embodiment as shown in FIG. 6, a power supply apparatus comprises a distribution member 92 which is arranged to stand in a vertical position on a working surface. Three power supply devices 94 are provided including extension arms 96 having connector supports 98 at their ends carrying connectors 100 thereon. Corresponding recesses 102 are provided in a vertical wall 104 of the distribution member each providing a cavity shaped to receive a power supply device 94. The power supply devices 94 are substantially similar to the devices 18 except as now described. Each of the arms 96 is connected to the housing member 92 by pivot connectors 106 to pivot about horizontal axes 108. The devices 94 can thus swing between retracted vertical positions in which they are received in the complementary recesses 102 (as shown for the centre device 94.2) and extended horizontal positions (as shown for the outer devices 94.1 and 94.3) in which the cordless connectors 100 are vertical and accessible.

An electrical cable 110 leading to a source of electrical power is also connected to the distribution member 92.

Figure 7:
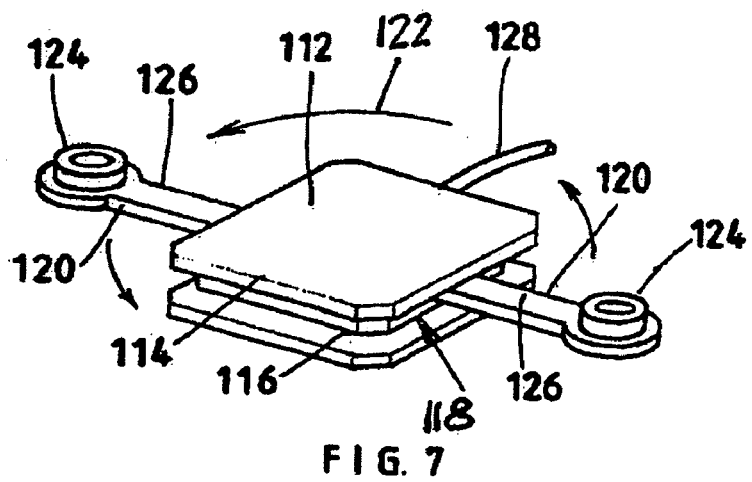
FIG. 7 is a perspective view of a still further power supply apparatus of the invention.

In FIG. 7 there is shown an arrangement wherein a distribution member 112 is generally square in plan. The distribution member 112 includes upper and lower plates 114 and 116 forming a cavity 118 therearound into which the inner ends of two power supply devices 120 are pivotally connected to swing in the direction of arrows 122. In this way the connectors 124 at the ends of the arms 126 forming the said devices 120 can be accessible in the most convenient places.

An electrical cable 128 leading to a source of electrical power is also connected to the distribution member 112.

Figure 8:
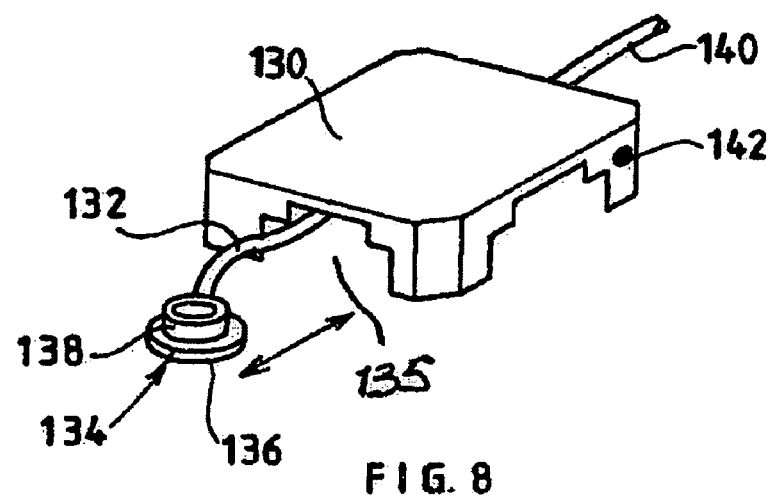
FIG. 8 is a perspective view of a simplified power supply apparatus of the invention.

Referring now to FIG. 8 there is shown a further power supply apparatus of the invention. In this embodiment, a distribution member 130 connected internally by a cable 132 to a simplified power supply unit 134. This unit 134 comprises a circular section base member or connector support 136. A vertical cylindrical cordless connector 138 is mounted coaxially on the support 136. The power supply unit 134 can be moved into a cavity 135 in the distribution member 130 for compact storage or outside (as shown) so that the connector 138 can be accessible to an appliance.

An electrical cable 140 leading to a source of electrical power is also connected to the distribution member 130. A safety cut out 142 is provided.

Figure 9:
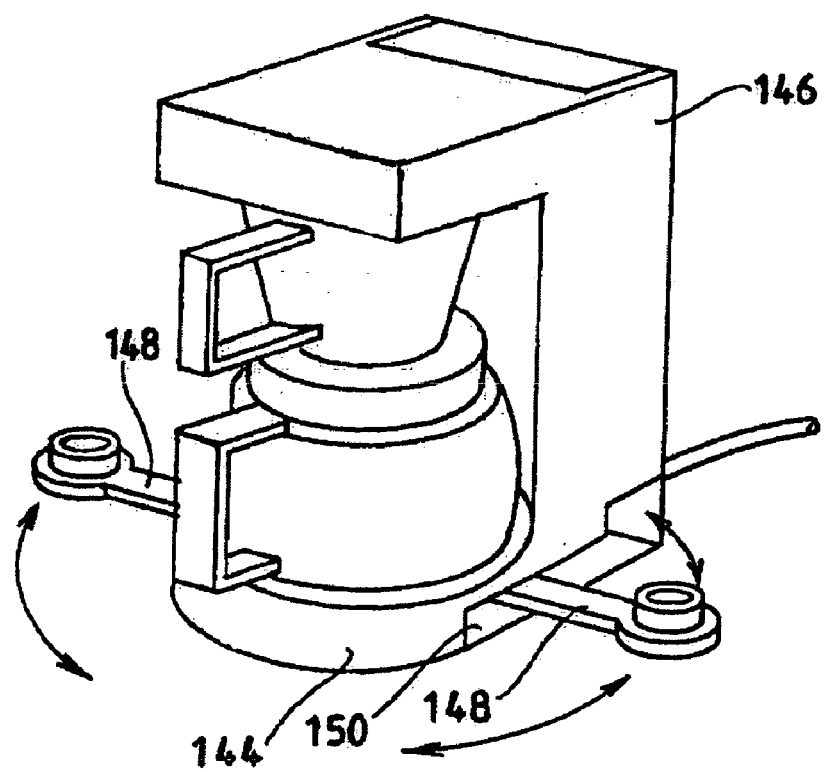
FIG. 9 is a perspective view of a percolator arrangement embodying a power supply apparatus of the invention.

In the embodiment of FIG. 9, the power supply unit embodies a distribution member 144 is incorporated in an appliance 146 here shown as a free standing coffee percolator. On opposite sides, the distribution member 144 has attached thereto power supply devices each incorporating an elongated extension arm 148. These arms 148 are identical to arms 18. Cavities 150 (only one shown) are provided on each side of the appliance 146. The arms 148 are pivoted about the distribution member to swing between extended positions in which they are accessible to other appliances and retracted positions within the cavities 150. It will be seen that when the various items are in their retracted positions, the area taken up by the power supply unit is minimal.

It will be appreciated that the exact shape and configuration of the embodiments described above, the connectors used and other elements and configurations and locations of the connectors on the base, the free standing unit and free standing appliance are purely exemplary and that numerous variations are possible without departing from the spirit and scope of the invention.

I claim:

1. A power supply device for domestic appliances comprising:
    a distribution member;
    an elongated member having an end and being connected to the distribution member;
    a connector support which is formed by the end of the elongated member and extending transversely thereto, and which in use rests on a work surface; and
    a cordless connector mountable on the connector support and being connectable to a source of power through the elongated member and the distribution member, wherein the connector support is of the same order of size as the connector;
    wherein the distribution member has a cavity and
    wherein the elongated member is movable relative to the distribution member from a retracted position in which the connector is within the cavity and an outer position in which the connector is accessible to an appliance.

2. A power supply device as claimed in claim 1 comprising a plurality of elongated members connected to the distribution member.

3. A power supply device as claimed in claim 1 wherein the distribution member has an upper surface on which an appliance may be mounted and a main unit connector on said upper surface connected to the receptor of the appliance.

4. A power supply device according to claim 1 wherein the elongated member is pivotally connected to the distribution member to pivot about a pivot axis between said retracted and outer positions.

5. A power supply device as claimed in claim 1 wherein the distribution member forms part of an appliance.

6. A power supply device as claimed in claim 5 wherein the appliance is a coffee percolator.

7. A power supply device for domestic appliances comprising:
    a cordless connector mounted on a work surface;
    a connector support of the same order of size as the connector, said support resting on the work surface when in use;
    an elongated member having an end being formed by the connector support and extending transversely thereto; and
    a distribution member having a cavity and being connectable to a source of power, the connector being connectable to the source of power throught the elongated member and the distribution member;
    wherein the elongated member is pivotally connected to the distribution member and the elongated member is movable between a retracted position in which the connector is contained within the cavity and an outer position in which the connector is accessible to an appliance.

8. A power supply device as claimed in claim 7 wherein the pivot axis is horizontal.

9. A power supply device as claimed in claim 7 wherein the pivot axis is vertical.

10. The combination as claimed in claim 7, wherein the appliance has an apparatus for supporting said appliance on a working surface.

11. The combination as claimed in claim 10, wherein said apparatus comprises at least one leg projecting downwardly from the appliance.

12. A power supply unit comprising: a plurality of elongated members, each having: a connector support at one end thereof; and a cordless connector mounted on the connector support; and a distribution member, wherein said plurality of elongated members are movably connected to said distribution member.

13. The power supply device as claimed in claim 12 wherein the distribution member is connectable to a source of electrical power and the connector is connectable to the source of electrical power through the connector support, the elongated member and the distribution member.

14. The power supply device as claimed in claim 12 wherein the distribution member has at least one cavity and wherein said plurality of elongated members can be moved between a retracted position within the cavity and an extended position outside the cavity.

15. The power supply device as claimed in claim 14 further comprising a plurality of pivot connections whereby said plurality of elongated members are connected to the distribution member to pivot relative thereto about pivot axes.

16. The power supply device as claimed in claim 15, wherein the pivot axes are vertical.

17. The power supply device as claimed in claim 16, wherein two elongated members of said plurality of elongated members are pivotally carried by the same pivot connection and wherein one elongated member of said two elongated members is longer than the other.

18. The power supply device as claimed in claim 15 wherein the pivot axes are horizontal and aligned.

19. The power supply device as claimed in claim 18 wherein the distribution member has a plurality of cavities shaped to receive the arms.

20. A power supply device for domestic appliances comprising:
    a distribution member;
    an elongated member having an end being connected to the distribution member;

a connector support which is formed by the end of the elongated member and extending transversely thereto, and which in use rests on a work surface; and a cylindrical cordless connector mounted on the connector support and being connected to a source of power through the elongated member and the distribution member;

wherein the elongated member is movable relative to the distribution member from a retracted position to an outer position in which the connector is accessible to an appliance.

* * * * *